United States Patent [19]
Vollers

[11] 4,080,841
[45] Mar. 28, 1978

[54] PUSH ELEMENT FOR TRANSMISSION BELT

[75] Inventor: Evert Jan Vollers, Haaren (N.B.), Netherlands

[73] Assignee: Van Doorne's Transmissle B.V., Netherlands

[21] Appl. No.: 728,169

[22] Filed: Sep. 30, 1976

[30] Foreign Application Priority Data

Oct. 9, 1975 Netherlands ............... 7511879

[51] Int. Cl.² ............................................. F16G 51/80
[52] U.S. Cl. ........................................................ 74/236
[58] Field of Search ............................................. 74/236

[56] References Cited

U.S. PATENT DOCUMENTS

| 1,601,663 | 9/1926 | Abbott | 74/236 |
| 2,322,466 | 6/1943 | Perry | 74/236 |
| 2,913,916 | 11/1959 | Schmidt | 74/236 X |
| 3,071,020 | 1/1963 | Maurer et al. | 74/236 |
| 3,175,410 | 3/1965 | Dittrich et al. | 74/236 X |

FOREIGN PATENT DOCUMENTS

| 1,066,329 | 6/1954 | France | 74/236 |

Primary Examiner—Leonard H. Gerin
Attorney, Agent, or Firm—Weingarten, Maxham & Schurgin

[57] ABSTRACT

A push element for a transmission belt comprising an endless carrier packed with a plurality of such elements to run on Vee-pulleys with variably spaced side plates. The surface of the element which comes into contact with the inside surface of the carrier is of convex shape to minimize wear resulting from improper alignment of the elements in use.

4 Claims, 3 Drawing Figures

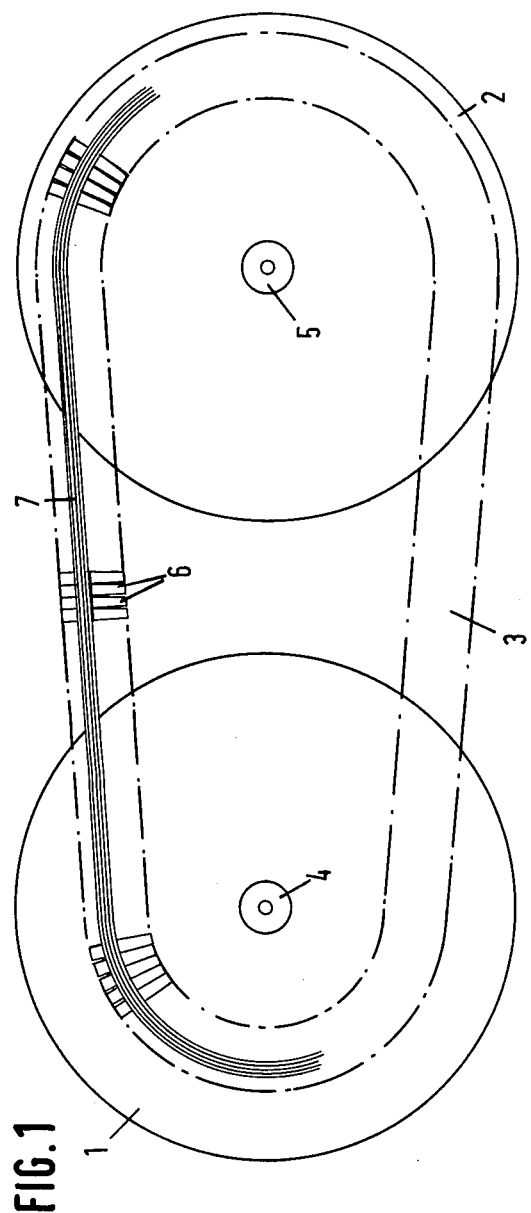
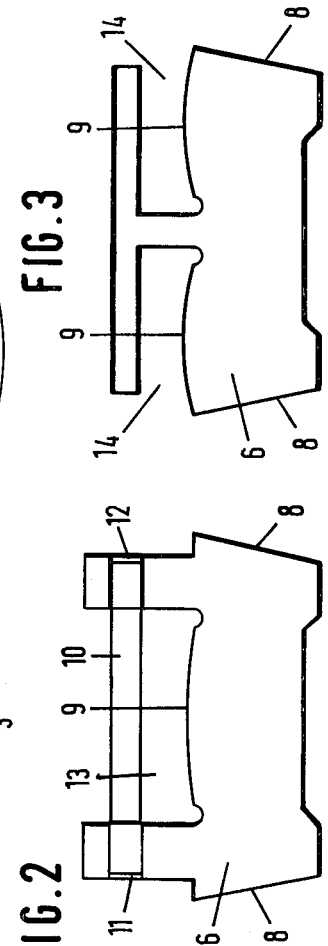
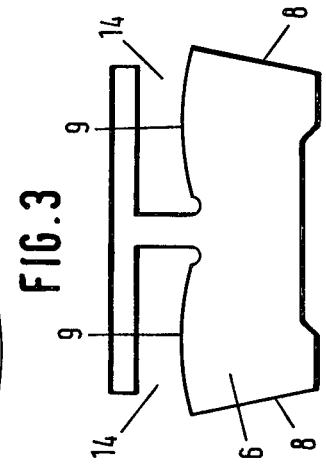

PUSH ELEMENT FOR TRANSMISSION BELT

This invention relates to a push element for a transmission belt, a plurality of which elements can be slidably arranged on an endless carrier, such as one or two metal belt packets, one behind another in the longitudinal direction thereof. Such a transmission belt is described, for example, in United States patent specification No. 3,720,113.

A transmission belt provided with such push elements can be used for transmitting a relatively large torque between two Vee-pulleys in which the spacing between the side-plates can be varied to provide an infinitely variable transmission ratio. In such an arrangement, unlike a normal transmission belt, the torque is transmitted using a pushing force, which is transmitted by the array of push elements. One condition is, of course, that the tension in the carrier must at all times be greater than the pushing force transmitted by the push elements arranged on the carrier.

In such a transmission belt, the push elements are made of a relatively hard material, e.g. metal, and so is the carrier. As the push elements are sildable on the carrier, for example, arranged thereon with some clearance, the belt is apt to become worn in use.

Experiments in which the transmission belt was tested when transmitting a great power for a long period of time have shown that the carrier, i.e., one or two belt packets is in contact with the push elements in such a manner that the push elements are damaged. It has been found that such damage or wear occurs in particular at places where the sides of the belt packets can come into contact with the push elements.

It is an object of the present invention to provide a push element shaped so as to avoid wear or damage resulting from contact with the sides of the belt packet or packets.

According to the present invention, there is provided a push element for a transmission belt comprising a plurality of such elements slidably arranged on a carrier, such as one or two packets of metallic belts, characterized in that the surface of the element that comes into contact with the inner surface of the carrier is convexly curved in the transverse direction.

Practice has shown that this is a highly effective solution to prevent the carrier from coming laterally into contact with the push element. The effect is based on the same principle as with a flat transmission belt which, running over a somewhat barrel-shaped pulley will tend to seek the highest point or the largest circumference thereof.

It has further been found that the use of push elements according to the invention, arranged on a carrier consisting of one belt or belt packet, results in a reduced load on the carrier. In use, when a push element engages a Vee-shaped pulley, it will assume a certain position relative to the pulley, guided by the sideplates thereof. Slight deviations from the correct position will cause irregularities in the surface formed by a series of successive push elements over which the carrier is tensioned, which will be an additional load on the carrier. When a push element according to the present invention occupies a slightly deviant position relative to the pulley, i.e., when it is slightly tilted in a plane perpendicular to the plane in which the pulley rotates, the irregularity in the surface contacting the carrier is much less than would be the case with a plane contacting surface as has hitherto been conventional.

Two embodiments of the invention will now be described, by way of example, with reference to the accompanying drawings, in which FIG. 1 is a diagrammatic cross-sectional elevation showing two pulleys with a transmission belt;

FIG. 2 shows a front view of a push element according to the present invention that can be arranged on a carrier consisting of one belt or belt packet; and FIG. 3 shows a front view of a push element according to the present invention that can be arranged on a carrier consisting of two belts or belt packets.

Referring to FIG. 1, there are shown two Vee-shaped pulleys 1, 2 and a transmission belt 3 tensioned about them. The diameters of the portions of belt 3 rounding pulleys 1 and 2 can be varied by controlling the spacing between the side plates of the pulleys. In this way the ratio between the speeds of rotation of shafts 4, 5 is infinitely variable.

Belt 3 consists of a plurality of push elements 6 slidably arranged on an endless carrier 7. Elements 6 are slightly tapered inwardly in cross-section, which facilitates their running around the pulleys. The number of push elements on carrier 7 is such that they are in contact with each other and fill up the entire belt.

In use, the tension of the carrier must be greater than the maximum pushing power transmitted by the elements, to prevent sagging of the straight portions of the belt.

Push elements 6 consist of a substantially nondeformable material, and carrier 7 is formed, for example, by a packet of metallic belts, i.e., a plurality of endless belts arranged one around another.

Referring to FIG. 2, there is shown a push element having two side faces 8 designed to cooperate with the side plates of Vee-shaped pulleys 1, 2, and a surface 9 over which carrier 7 can be arranged. By means of pin 10, which extends through holes 11 and 12, there is formed a four-sided slot for carrier 7. In the embodiment of FIG. 2, pin 10 is a clamping fit in hole 11 and slidable in hole 12. Surface 9 is of slightly convex shape in the transverse direction (parallel to the plane of drawing) having a radius of curvature of between 150 and 2000 mm, preferably between 300 and 1800 mm.

In FIG. 3, parts corresponding to FIG. 2 are designated by the same reference numerals. Each of recesses 14 is adapted to receive a belt packet as a carrier. The two surfaces 9, each serving to contact the inside of a belt packet, are each of slightly convex shape.

I claim:

1. A push element for a transmission belt comprising a plurality of said elements in face-to-face contacting relationship to fill the length of said belt slidably arranged on a carrier, such as one or two packets of metallic belts, the outwardly facing surface of said push element that comes into contact with the inner surface of said carrier being convexly curved in the transverse direction, said push element being made of substantially nondeformable material.

2. A push element according to claim 1, wherein the radius of curvature of said convex surface ranges between 150 and 2000 mm.

3. A push element according to claim 1, wherein the radius of curvature of said convex surface ranges between 300 and 1800 mm.

4. A transmission belt comprising:

an endless carrier comprised of at least one endless belt;

a plurality of push elements made of substantially nondeformable material, said carrier being slidably threaded through an opening in each said push element, the outwardly facing surface of said push element contacting said carrier being convexly curved in the transverse direction, said push elements being arranged on said carrier in face-to-face contact thereby filling up the entire length of said belt.

* * * * *